US005178253A

United States Patent [19]

Fix

[11] Patent Number: 5,178,253

[45] Date of Patent: Jan. 12, 1993

[54] SWING MECHANISM FOR A VEHICULAR CONVEYOR

[75] Inventor: Robert L. Fix, Hagerstown, Md.

[73] Assignee: Ingersoll-Rand Company, Woodcliff Lake, N.J.

[21] Appl. No.: 749,881

[22] Filed: Aug. 26, 1991

[51] Int. Cl.$^5$ .............................................. B65G 21/10

[52] U.S. Cl. ................................ 198/317; 198/861.6; 414/345; 414/398; 414/505; 414/523

[58] Field of Search .................. 198/317, 861.6, 861.4, 198/587, 589; 414/345, 398, 505, 523; 404/90, 91, 86

[56] References Cited

U.S. PATENT DOCUMENTS

| | | | |
|---|---|---|---|
| 2,451,656 | 10/1948 | Birch | 414/523 |
| 2,634,870 | 4/1953 | Barnum | 414/398 |
| 3,724,168 | 4/1973 | Cassady, Jr. et al. | 414/523 X |
| 3,951,288 | 4/1976 | Hale et al. | 414/523 X |
| 3,987,890 | 10/1976 | Merritt | 198/317 X |
| 4,044,906 | 8/1977 | Schrag et al. | 414/523 X |
| 4,228,890 | 10/1980 | Tothfalusi | 198/514 |
| 4,456,419 | 6/1984 | Counts et al. | 414/398 |
| 4,834,463 | 5/1989 | Nye | 414/523 X |

FOREIGN PATENT DOCUMENTS

| | | | |
|---|---|---|---|
| 3700568 | 7/1988 | Fed. Rep. of Germany | 414/398 |
| WO88/03907 | 6/1988 | PCT Int'l Appl. | 414/398 |

*Primary Examiner*—Robert P. Olszewski
*Assistant Examiner*—Cheryl L. Gastineau
*Attorney, Agent, or Firm*—Glenn B. Foster; John J. Selko

[57] ABSTRACT

An apparatus for displacing a conveyor includes a conveyor frame which displaceably supports a conveyor belt. A first mount rigidly supports the conveyor frame as a second mount is affixed to a vehicle; the first mount being pivotably connected to the second mount at a pivot axis. A link member is pivotally connected to the first mount. An extendable device pivotally connect the link member and the second mount, the extendable device axially extends and retracts resulting in displacement of the link member. There are a plurality of extendable devices, at least some of which are located on opposed lateral sides of said pivot axis, each extendable device, when retracted, extends those extendable devices on the opposed lateral side of the pivot axis.

10 Claims, 5 Drawing Sheets

SWING MECHANISM FOR A VEHICULAR CONVEYOR

BACKGROUND OF THE INVENTION

This invention relates generally to conveyor systems and more particularly to swing mechanisms for laterally displacing conveyors to be used in conjunction with road working equipment.

Most road milling machines incorporate a conveyor system to transfer milled road material into dump trucks to be carried away from the work site. There is typically a swing mechanism attached to these conveyors permitting swinging of the conveyor about a vertical axis relative to the road working machines.

Current swing systems feature hydraulic cylinders or other extendable members which are attached directly between the conveyor frame support and the vehicular frame. In order to accommodate this design configuration, the swing angle of the conveyor is limited to approximately forty five degrees from either side of center. The cylinders utilized to displace these conveyors are typically grossly oversized to permit for decreasing effective moments from a constant cylinder force when the cylinders reach the limits of their travel.

The force exerted from the hydraulic cylinders which are required to produce a constant torque applied between the conveyor mount and the vehicle frame in the prior art swing mechanisms vary considerably depending upon the relative position between the two members.

The greater the swing angle permitted with cylinders of constant size, the more versatile is the conveyor system. For example, it may be desired to feed to trucks which are located at the side of the milling machine as well as directly in front of it, and at various positions therebetween.

The prior art conveyor swing mechanisms rely upon the single hydraulic cylinder to restrict relative motion between the conveyor frame and the vehicle. A more positive locking mechanism could be provided, as in the present invention, by two oppositely acting drive devices.

The foregoing illustrates limitations known to exist in present swing mechanisms for road machinery. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an apparatus for displacing a conveyor including a conveyor frame which displaceably supports a conveyor belt. A first mount rigidly supports the conveyor frame as a second mount is affixed to a vehicle; the first mount being pivotably connected to the second mount at a pivot axis. A link member is pivotally connected to the first mount. Extendable means pivotally connect the link member and the second mount, the extendable means axially extends and retracts for displacement of the link member.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 5:
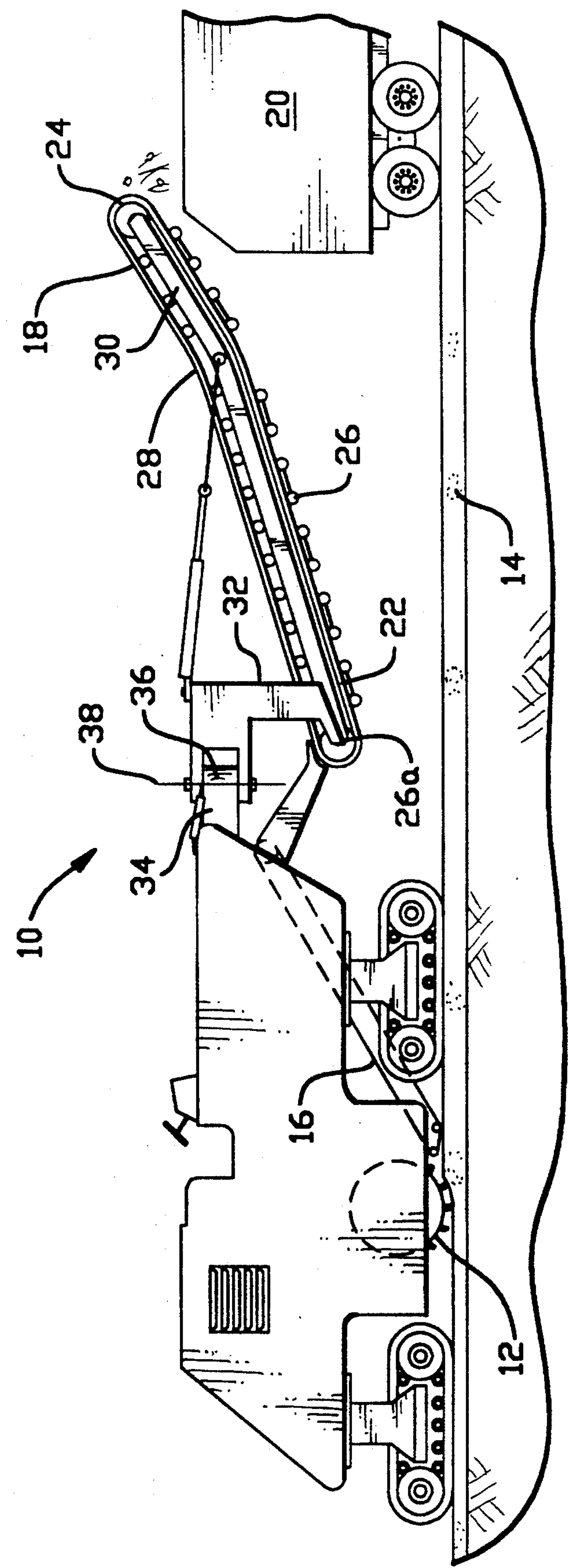
FIG. 5 is a left side elevational view of the conveyor swing mechanism of FIG. 2.

A road working vehicle, specifically a pavement milling machine 10 includes a milling drum 12 which is capable of cutting through asphalt pavement 14 (see FIG. 5). The pavement remains from the milling drum 12 are fed onto a fixed conveyor 16 which transfers the pavement remains to a swing conveyor 18. The swing conveyor 18 transfers the pavement remains to a collecting vehicle 20 which is travelling at the same speed as the milling machine.

The swing conveyor 18 has a first end 24 which is pivotally supported adjacent the milling machine 10. A second end 24 can be laterally displaced to be positioned as desired over the collection vehicle 20 when the milling machine 10 is in use. A plurality of rollers which 26 support the swing conveyor 18 include a driven roller 26a whose rotational displaces a conveyor belt 28 as is well known in the art. The rollers 26, 26a are supported by a conveyor frame 30.

The conveyor frame 30 is rigidly supported by a first mount 32 adjacent the first end 22 thereof. A second mount 34 is rigidly connected to the milling machine 10. The first mount 32 is connected to the second mount 34 via a pivot member 36 which permits relative displacement of the two mounts about a vertical pivot axis 38 resulting in displacement of the swing conveyor between the positions illustrated in solid and those illustrated in phantom.

Figure 1:
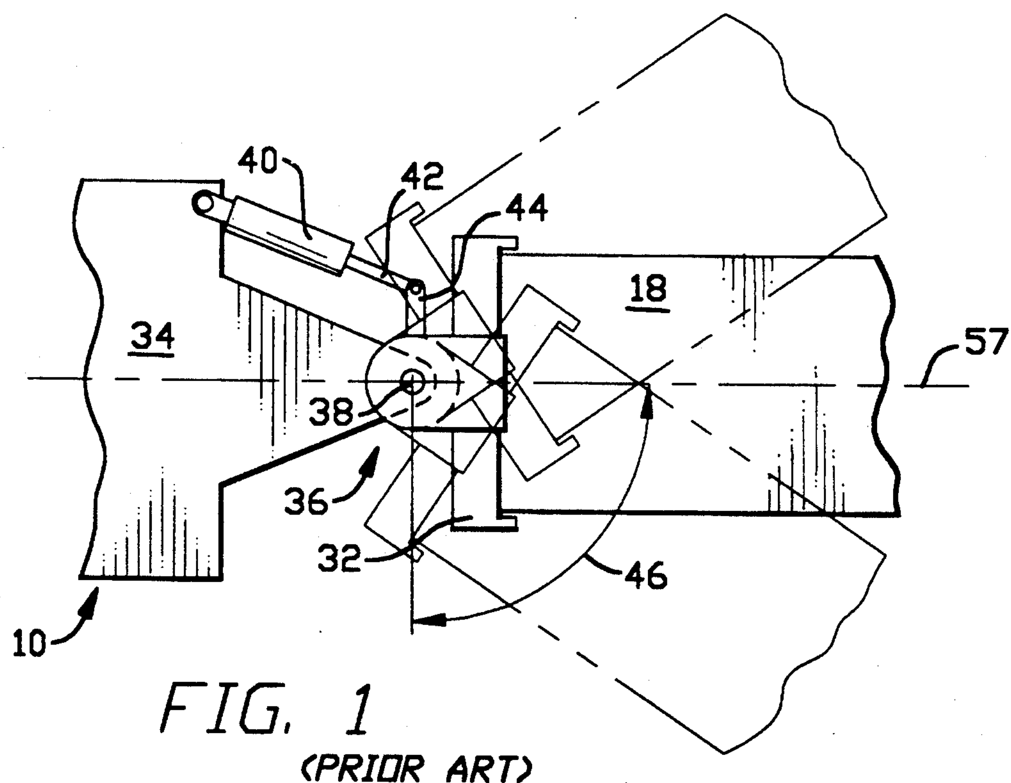
FIG. 1 is a top sectional view illustrating an embodiment of prior art vehicular conveyor swing mechanism affixed to a milling machine, the limits of the conveyor travel are illustrated in phantom.

Forming the subject matter of the present invention are the elements which cause displacement of the swing conveyor 18 about the vertical pivot axis 38 relative to the milling machine 10. FIG. 1 illustrates a prior art displacement system including a single hydraulic cylinder 40 with a first end 42 acting on an arm 44 which is rigidly affixed to the first mount 32.

Since the arm 44 is fixed relative to the first mount, translation of a force exerted by the hydraulic cylinder 40 into a torque applied to the first mount 32 about the vertical pivot axis will be based upon and angle 46 between the arm 44 and a extension axis 48 of the hydraulic cylinder 40. The greater the angle 46 is (and is still under 90 degrees), the greater will be the applied torque of the first mount 32 about a vertical pivot axis 38 for a given force exerted by the hydraulic cylinder 40.

Since the angle 46 geometry makes such a difference in resultant torque, swing conveyor displacement systems of these types are typically limited to permitting swing only to approximately forty five degrees of the straight ahead position (where the longitudinal axis of the swing conveyor 18 is aligned with the longitudinal axis of the milling machine) on either side, or to the positions illustrated in phantom in FIG. 1.

These prior art swing mechanisms also typically require oversized hydraulic cylinders 40 to apply adequate torque to effectively operate the swing mechanism when the swing conveyor is angled near the minimum limits of the angle 46. These oversized hydraulic cylinders result in increased cost, weight and complexity of the machine.

Figure 2:
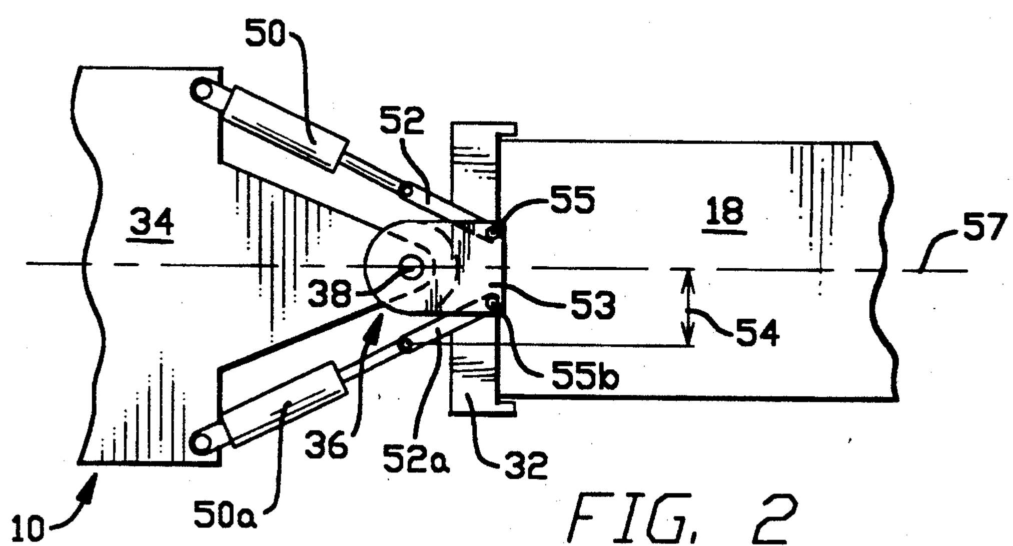
FIG. 2 is a top sectional view illustrating an embodiment of vehicular conveyor swing mechanism of the present invention affixed to a milling machine with the conveyor in the straight ahead position.

One embodiment of present invention vehicular conveyor swing mechanism is illustrated in FIG. 2. A first and a second axially extendable member or element 50, 50*a* are pivotably connected between the second mount 34 and a first and second linkage member 52, 52*a*, respectively on opposed lateral sides of the pivot member 36. In this specification, opposed lateral sides indicates positioned on opposite sides of longitudinal axis 57. The linkage members 52, 52*a* pivotally connect the axially extendable members 50, 50*a* to an ear portion 53 via pivot elements 55, 55*b*. The ear portion is rotatably fixed relative to the first mount 32. This linkage arrangement results in expansion of extendable member 50 whenever extendable member 50*a* is retracted and vice versa.

The axially extendable members 50, 50*a* are structurally identical to each other and are mounted so retraction of one will result in relative rotation of the first mount 32 in an opposite direction to effectively extend the other. Hydraulic cylinders, pneumatic cylinders, screw mechanism or any other well known type of axial motion imparting device may be used as axially extendable members.

Figure 7:
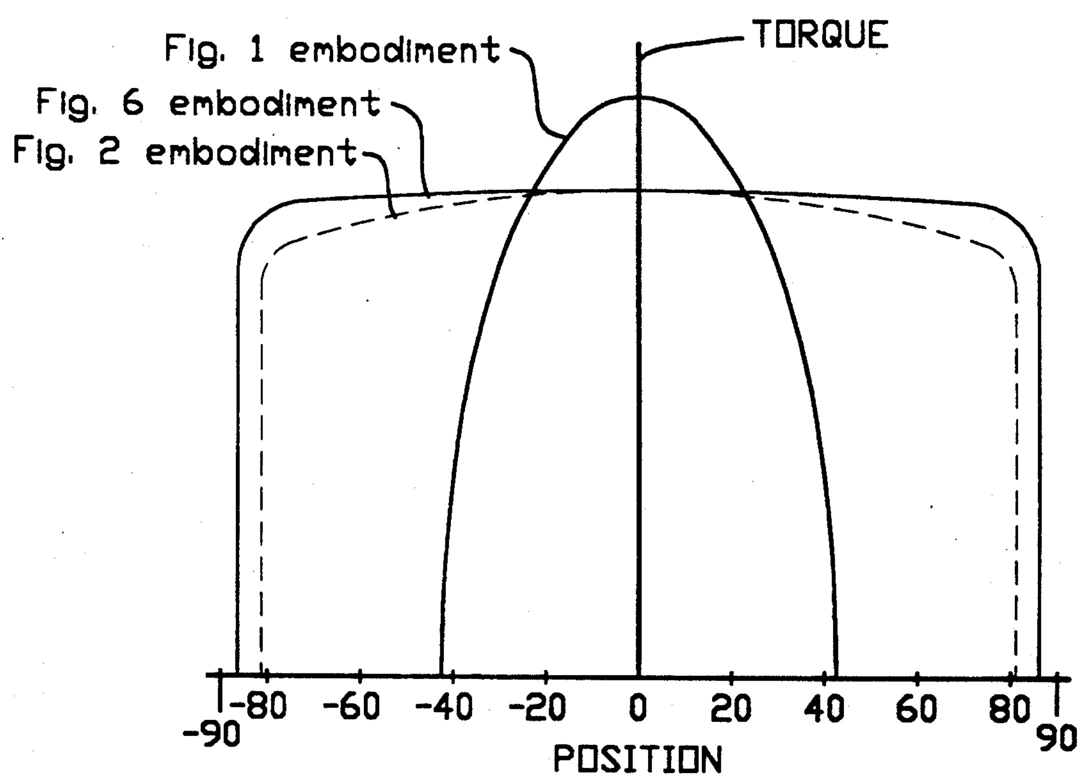
FIG. 7 is a graph illustrating the effective torque resulting from a constant force exerted by the axially extendable member of the conveyor swing mechanisms of FIGS. 1, 2 and 6.

The linkage members 52, 52*a* replace the arm 44 of the prior art. The linkage results in a much more even transmission of torque to the first mount throughout the entire rotational range of travel of the swing conveyor as illustrated in FIG. 7.

The basis of the present invention is that a radial distance 54 from a longitudinal axis 57 of the vehicle 10 to the linkage members 52, 52*a* is maintained approximately constant through the entire swing range of the swing conveyor 18. This geometry ensures that a given axial force applied from the axially extendable members 50, 50*a* will result in a nearly constant torque applied to the first mount 32 about the vertical pivot axis 38.

Figure 3:
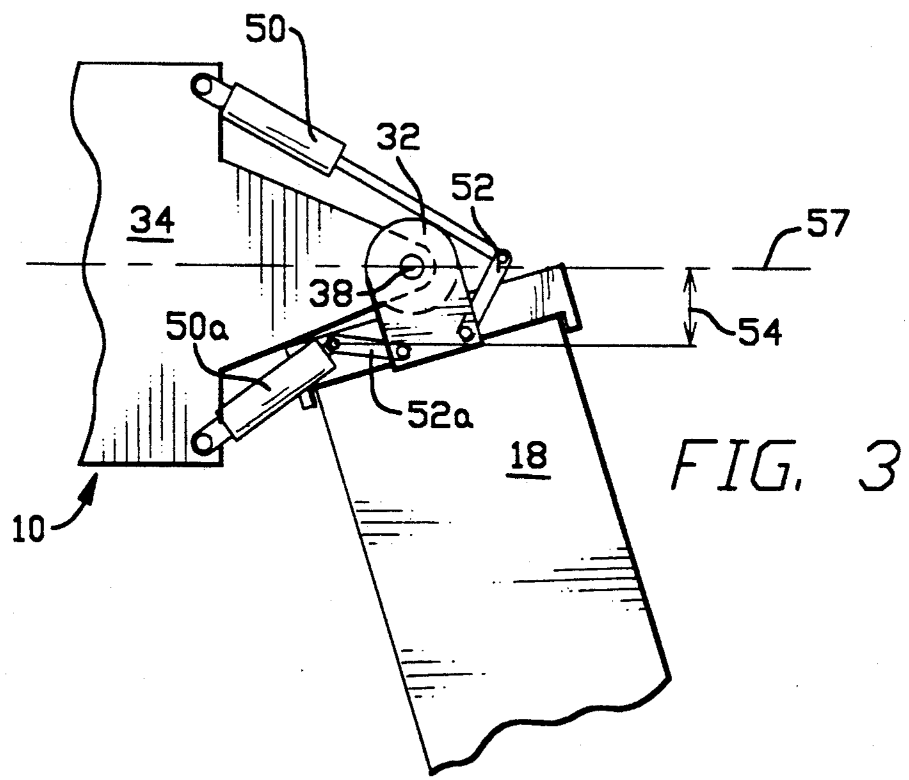
FIG. 3 is a view similar to FIG. 2, except with the conveyor angled eighty degrees to the right.

FIG. 3 illustrates the greater freedom of travel permitted by the swing mechanism of the present invention including the linkage members 52, 52*a*. In place of the forty five degree swing to both sides of center permitted by the FIG. 1 prior art embodiment, the present invention permits approximately eighty degrees of travel on either side of center. This increased travel results from the interaction of the linkage members 52, 52*a* relative to the vertical pivot axis 38.

The axially extendable members 50, 50*a* of the present invention are configured to apply force through the retraction stroke. The linkage arrangement is configured so that regardless of what an angle is between the milling machine 10 and the swing conveyor 18, as illustrated in FIGS. 2 and 3, the force exerted from the axially extendable members act substantially parallel to the longitudinal axis 57 of the vehicle 10.

Figure 6:
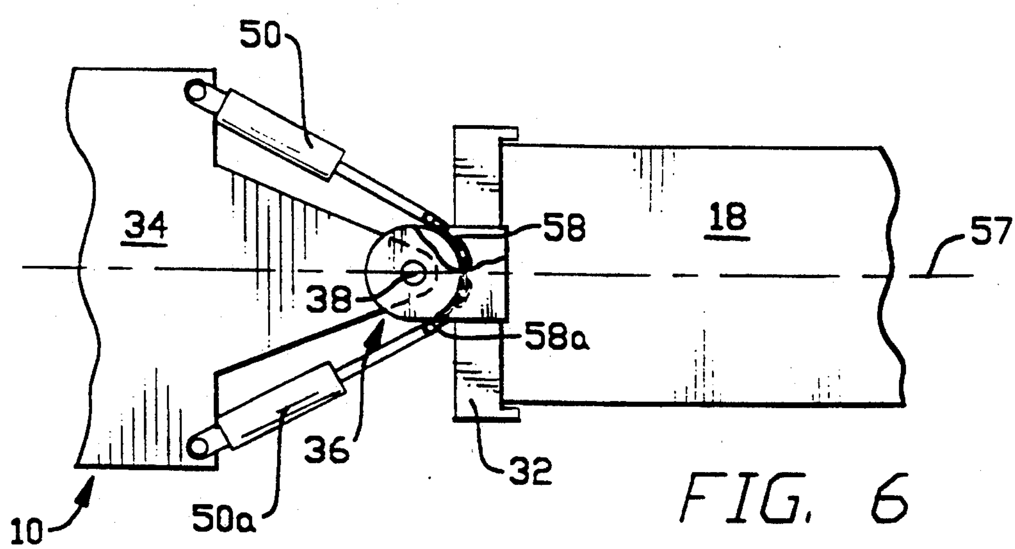
FIG. 6 is a view similar to FIG. 2 utilizing a second embodiment of swing mechanism involving a link member with a plurality of links.

FIG. 6 illustrates an alternate embodiment of swing mechanism in which the linkage members 52, 52*a* of the FIG. 2 embodiment is replaced by a chain member 58, 58*a*. Each chain member 58, 58*a* is attached between the extendable members 50, 50*a* and the first mount by a method well known in the art, respectively. The chain members 58, 58*a* can be considered as a flexible link member similar in function to elements 52, 52*a* of the FIGS. 2 and 3 embodiment. How and specifically where the chain members 58, 58*a* are connected to the first mount 32 is a matter of design choice and desired swing range of the swing conveyor 18. This configuration permits an even larger range of swing from center than that of the FIG. 2 embodiment.

In addition, the multiplicity of links permits an even more constant production of torque through the entire swing range for a given force applied from the axially extendable members 50, 50*a* than in the FIG. 2 embodiment. This results from the distance 54 between the link and the longitudinal axis 57 of the vehicle being maintained through the entire swing range closer to a constant figure than in the FIG. 1 prior art embodiment.

Figure 4:
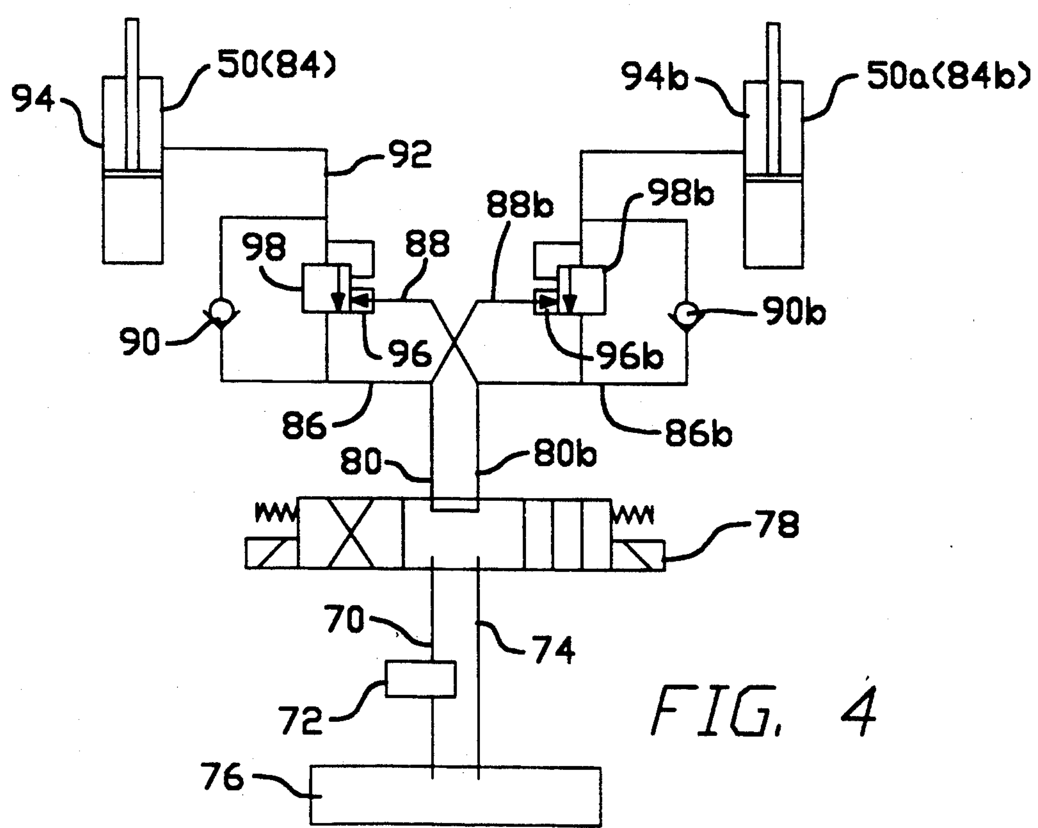
FIG. 4 is a schematic diagram of the hydraulic system used to displace the two axially extendable elements illustrated in FIG. 2.

FIG. 4 is a schematic view illustrating a suitable feed system to power the axially extendable member or elements 50, 50*a* (for example hydraulic cylinders 84, 84*b*) of the present invention. A pilot line 70 is in communication with a pressure source 72 and a reservoir 76. A tank line 74 is in fluid communication with a reservoir 76. A direct control valve 78 controls passage of fluid in the pilot line 70 and the tank line 74 to a first conduit 80 and a second conduit 80*b*.

Since fluid pressure applied to the first conduit result in the same action to a first hydraulic cylinder 84 relative to a second hydraulic cylinder 84*b* as application of fluid in the second conduit 80*b* results in action of the second hydraulic cylinder relative to the first hydraulic cylinder, only the application of fluid from the first conduit 80 to the first hydraulic cylinder 84 and the second hydraulic cylinder 84*b* will be detailed here. The reverse is true for application of fluid to the second conduit 80*b*.

The fluid pressure applied to the first conduit 80 is also applied to conduits 86 and 88*b*. Sufficient fluid pressure in conduit 86 will bias a check valve 90 open, resulting in application of fluid pressure to conduit 92. The fluid pressure in conduit 92 is in communication with a return chamber 94 of the first hydraulic cylinder 84. Fluid pressure in the return chamber 94 of either hydraulic cylinder 84, 84*a* results of displacement of that cylinder in the return direction 95.

The first conduit 80 is also in fluid communication with conduit 88 and an actuator 96 of a control valve 98. Sufficient fluid pressure applied to conduit 88 will result in the control valve 98 releasing fluid contained in a second return chamber 94*a* of the second hydraulic cylinder to the reservoir 76. In this manner, fluid pressure applied to the first conduit 80 will result in retraction of the first hydraulic cylinder 84 thereby resulting in expansion of the second hydraulic cylinder 84*b* through direct mechanical linkage (see FIGS. 2 and 3).

If fluid pressure is applied to neither the first conduit 80 nor the second conduit 80*b*, no fluid will pass through either check valve 90, 90*b* or control valves 98, 98*b* of the first and the second hydraulic cylinders 84, 84*b*. This containment for fluid in both return chambers 94, 94*b* results in both hydraulic cylinders being "locked" into position. Therefor, the only way the swing conveyor can be displaced in the normal course of operating conditions is to apply fluid pressure to either the first conduit 80 or the second conduit 80*b*.

While this invention has been illustrated and described in accordance with a preferred embodiment, it is recognized that other variations and changes may be made therein without departing from the invention as set forth in the claims.

Having described the invention, what is claimed is:

1. An apparatus for displacing a conveyor comprising:

a conveyor frame which displaceably supports a conveyor belt;

a first mount rigidly supporting the conveyor frame;

a second mount affixed to a vehicle, the first mount being pivotably connected to the second mount at a pivot axis;

a link member pivotally connected to the first mount; and extendable means, pivotally connecting the link member and the second mount, for axially extending and retracting resulting in displacement of the link member.

2. The apparatus as described in claim 1, wherein there are a plurality of extendable means, at least some of which are located on opposed lateral sides of said pivot axis, each extendable means, when retracted, extends those extendable means on the opposed lateral side of the pivot axis.

3. The apparatus as described in claim 1, wherein the extendable means and the link member provide a range of displacement of the first mount relative to the second mount about the pivot axis in excess of fifty degrees.

4. The apparatus as described in claim 3, wherein the force exerted by the extendable means to apply a constant torque between the vehicle and the conveyor is substantially even through said range.

5. The apparatus as described in claim 1, wherein the link member consists of a single link.

6. The apparatus as described in claim 1, wherein the link member consists of a plurality of links.

7. An apparatus for displacing a conveyor comprising:

a conveyor frame which displaceably supports a conveyor belt;

a first mount which rigidly supports the conveyor frame;

a second mount affixed to a vehicle, the first mount is pivoted relative to the second mount about a vertical axis;

an extendable element having a first end and a second end, the first end being connected to the second mount, displacement of the extendable element results in displacement of the first mount;

a link member, connected between the second end of the extendable element and the first mount, which maintains the radial distance between the axis of the extendable element and the vertical axis constant through a wide range of displacement between the first mount and the second mount.

8. The apparatus as described in claim 7, wherein each link member consists of a single link.

9. The apparatus as described in claim 7, wherein the link member consists of a plurality of links to form a chain.

10. An apparatus for displacing a conveyor comprising:

a conveyor frame which displaceably supports a conveyor belt;

a first mount which rigidly supports the conveyor frame;

a second mount affixed to a vehicle, the first mount is pivoted relative to the second mount about a vertical axis;

a plurality of extendable elements having a first end and a second end, the first end being connected to the second mount, displacement of any axially extendable element results in displacement of the first mount;

link means, connected between the second end of the axially extendable element and the first mount, for maintaining the torque applied to the first mount substantially constant for a given force exerted by the axially extendable element through a wide range of displacement between the first mount and the second mount.

* * * * *